United States Patent [19]

Fukushima et al.

[11] Patent Number: 4,788,099
[45] Date of Patent: Nov. 29, 1988

[54] VIBRATION-DAMPING MATERIAL WITH EXCELLENT WORKABILITY

[75] Inventors: Nobuo Fukushima, Otsu; Shuji Kitamura, Nagaokakyo; Kiyohiko Nakae, Nishinomiya; Yoshiaki Togawa, Kyoto; Kozo Kotani, Toyonaka; Toshitsugu Kikuchi, Ibaraki; Seiichi Shibata, Takatsuki, all of Japan

[73] Assignees: Sumitomo Chemical Company Limited; Sumitomo Metal Industries, Ltd., both of Osaka, Japan

[21] Appl. No.: 94,021

[22] Filed: Sep. 3, 1987

Related U.S. Application Data

[63] Continuation of Ser. No. 658,633, Oct. 9, 1984, abandoned.

[30] Foreign Application Priority Data

| Oct. 13, 1983 | [JP] | Japan | 58-192019 |
| Jul. 12, 1984 | [JP] | Japan | 59-145782 |
| Jul. 12, 1984 | [JP] | Japan | 59-145783 |

[51] Int. Cl.$^4$ ............................................. B32B 7/02
[52] U.S. Cl. ............................ 428/215; 428/212; 428/332; 428/461; 428/463; 428/495; 428/517; 428/518; 428/519
[58] Field of Search ............ 428/212, 215, 461, 463, 428/495, 517, 518, 519, 332

[56] References Cited

U.S. PATENT DOCUMENTS

| 3,547,755 | 12/1970 | Oberst et al. | 161/165 |
| 3,640,830 | 2/1972 | Oberst et al. | 161/165 |
| 3,646,158 | 2/1972 | Eustice | 428/220 |
| 3,721,597 | 3/1973 | Colburn | 156/309 |
| 3,833,404 | 9/1974 | Sperling et al. | 428/413 |
| 4,075,288 | 2/1978 | Graveron et al. | 428/521 |
| 4,313,996 | 2/1982 | Newman et al. | 428/215 |
| 4,330,587 | 5/1982 | Woodbrey | 428/461 |
| 4,346,782 | 8/1982 | Böhm | 427/407.1 |
| 4,357,383 | 11/1982 | Howden et al. | 428/215 |
| 4,407,893 | 10/1983 | Malizrio | 428/461 |
| 4,449,014 | 5/1984 | Brezinsky | 428/461 |

FOREIGN PATENT DOCUMENTS

| 812212 | 5/1969 | Canada | 428/463 |
| 115103 | 8/1964 | European Pat. Off. | 428/461 |
| 2059340 | 4/1981 | United Kingdom . | |

Primary Examiner—Sharon A. Gibson
Attorney, Agent, or Firm—Stevens, Davis, Miller & Mosher

[57] ABSTRACT

A vibration-damping material with excellent workability consisting of two metal plates and a vibration-damping layer of a thermoplastic resin interposed between the two metal plates, in which the vibration-damping layer of a thermoplastic resin consists of a film as a middle layer and a polyolefin type resin (B) provided on both sides of the film as an upper and lower layer, the film as the middle layer being composed of (1) at least one resin (A) selected from the group consisting of polyolefin type resins and ionomer resins each having a modulus of elasticity in shear at 20° C. of $3 \times 10^9$ to $1 \times 10^7$ dyne/cm$^2$, a percentage of elongation at 20° C. of 50% or above and a peak temperature of dissipation factor (tan δ) of $-120°$ C. to 80° C. or (2) a resin mixture of the resin (A) and a synthetic rubber having a percentage of elongation at 20° C. of 100% or above and a peak temperature of dissipation factor (tan δ) of $-120°$ to 50° C., and the polyolefin type resin (B) having a modulus of elasticity in shear at 20° C. larger than that of the resin (A), a percentage of elongation at 20° C. of 10% or above, a peak temperature of dissipation factor (tan δ) of $-40°$ to 180° C. and a bonding strength toward the metal plates at 20° C. and 180° -peeling of 3 kg/cm or above.

7 Claims, 4 Drawing Sheets

VIBRATION-DAMPING MATERIAL WITH EXCELLENT WORKABILITY

This application is a continuation of application Ser. No. 658,633, filed Oct. 9, 1984, now abandoned.

BACKGROUND OF THE INVENTION

1. Field of the Invention

This invention relates to a vibration-damping material with excellent workability in deep drawing, bending, etc.

2. Description of the Prior Art

In recent years, the influence of noises caused by transportation means such as automobiles, railroads and the like or of noises and vibrations generated at construction sites upon residents in the neighborhoods is becoming more and more serious incurring a big social problem. As one means for solving the problem, research and development on vibration-absorbing materials having a vibration-absorbing ability by themselves has been made, and as a result, vibration-damping materials having a large vibration-absorbing ability and suitable for various application purposes are already in use as structural members of vehicles, vessels, industrial machines, iron bridges, etc. As these vibration-damping materials, there have hitherto been known multilayer type structures using, for its middle layer, a composition such as vinyl acetate-ethyl acrylate copolymer (Japanese Patent Publication No. 35662/1970), a copolymer obtained by grafting a vinyl acetate-ethylene copolymer with a mixture of styrene and acrylonitrile (Japanese Patent Publication No. 17064/1971) or the like, materials composed of a bitumen and a filler such as calcium carbonate or the like, and so forth.

These vibration-damping materials each show a vibration-absorbing ability in a particular temperature range when made into a multilayer structure together with metal plates. However, such multilayer structures have various drawbacks such as poor deep drawing or bending in mechanical pressing (due to insufficient bonding with metal plates, small modulus of elasticity of middle layer composition, etc.), poor heat resistance and the like. Thus, they are insufficient in secondary workability as vibration-damping metal plates.

When the conventional vibration-damping materials were used in applications where they are immersed in an oil, such as oil pans of automobiles, parts of machine tools and the like, and when the materials were composed of a resin material poor in oil resistance, they apparently showed a low bonding strength with steel plates resulting in poor workability and/or insufficient vibration-damping ability.

The conventional vibration-damping metal plates have various drawbacks in workability in mechanical pressing, etc. For example, in deep drawing, metal plates cause slipping at the ends and, in an extreme case, two upper and lower layer metal plates come off a middle layer vibration-damping resin and cause separation. Further, the low elasticity of the resin layer causes problems such as surface waviness of shaped article, wrinkle formation at curved corner surfaces and the like. In severe 180° bending (so-called hemming) which is applied to the ends of vibration-damping metal plates, waviness and wrinkle formation appearing at the surfaces of metal plates become more serious making these meatl plates unusable in practical application.

SUMMARY OF THE INVENTION

In view of the above drawbacks of conventional vibration-damping materials, the present invention is intended to provide a vibration-damping material excellent in workability in deep drawing, bending, etc. as well as in vibration-absorbing ability.

In order to provide such an excellent vibration-damping material, the present inventors made extensive studies. As a result, it was found out that a vibration-damping material obtained by interposing a multilayer film having the following definition between two metal plates and pressure-bonding them with heating is excellent in workability, heat resistance, vibration-absorbing ability and, depending upon cases, oil resistance. A multilayer film consisting of a middle layer film and a polyolefin type resin (B) provided on both sides of the middle layer film as an upper and lower layer film, the middle layer film being composed of (1) at least one resin (A) selected from the group consisting of polyolefin type resins and ionomer resins each having a modulus of elasticity in shear at 20° C. of $3 \times 10^9$ to $1 \times 10^7$ dyne/cm$^2$, a percentage of elongation at 20° C. of 50% or above and a peak temperature of dissipation factor (tan δ) of $-120°$ to 80° C. or (2) a resin mixture of the resin (A) and a synthetic rubber having a percentage of elongation at 20° C. of 100% or above and a peak temperature of dissipation factor (tan δ) of $-120°$ to 50° C., and the polyolefin type resin (B) having a modulus of elasticity in shear at 20° C. larger than that of the resin (A), a percentage of elongation at 20° C. of 10% or above, a peak temperature of dissipation factor (tan δ) of $-40°$ to 180° C. and a bonding strength toward the metal plates at 20° C. and 180°-peeling of 3 kg/cm or above. Based on this finding, the present invention has been attained.

According to the present invention, there is provided a vibration-damping material having (1) good bonding property toward metal plates even under a bonding condition of relatively low temperatures, (2) excellent workability even under severe working conditions of deep drawing and bending owing to a multiple layer film consisting of resins different in modulus of elasticity and percentage of elongation and (3) a large vibration-absorbing ability over a very wide temperature range owing to a multiple layer film consisting of resins different in peak temperature of dissipation factor (tan δ). When, in the vibration-damping material of the present invention, the resin (A) is a particular type of resin such as, for example, a saponification product of an ethylene-vinyl acetate copolymer or the like, the vibration-damping material of the present invention does not reduce its vibration-damping ability and workability even after having been exposed to a machine oil, etc. for a long period of time.

REFERENCE TO THE DRAWINGS

In the accompanying drawings,

FIG. 1 (b) is a perspective view of a shaped article obtained in bending test;

FIG. 2 (b) is a perspective view of a shaped article obtained in deep drawing test.

DETAILED DESCRIPTION OF THE INVENTION

Figure 1A:
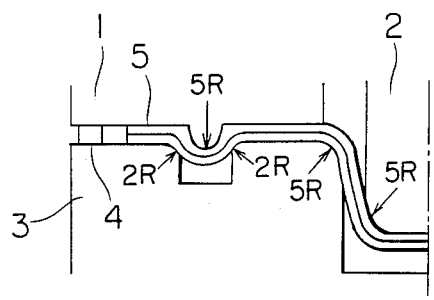
FIG. 1 (a) is a sectional view of a die used in bending test.

The present invention will be explained in detail below.

As the resin (A) selected from polyolefin type resins and ionomer resins each having a modulus of elasticity in shear at 20° C. of $3 \times 10^9$ to $1 \times 10^7$ dyne/cm$^2$, a percentage of elongation at 20° C. of 50% or above and a peak temperature of dissipation factor (tan $\delta$) of $-120°$ to 80° C., there are mentioned α-olefin homopolymers, copolymers of an α-olefin (main component) with a different monomer. Specific examples of the resin (A) include low density polyethylenes, ethylene-propylene copolymers, ethylenebutene copolymers, ethylene-vinyl acetate copolymers, ethylene-acrylic acid copolymers, ethylene-methacrylate copolymers, saponification products of ethylene-vinyl acetate copolymers, saponification products of ethyleneacrylate copolymers, saponification products of ethylenemethacrylate copolymers, etc. Ionomer resins mentioned above are resins obtained by copolymerizing an α-olefin with an α,β-unsaturated carboxylic acid and crosslinking the resulting copolymer with a metal ion. Ordinarily, there is used ethylene for the α-olefin and methacrylic acid for the α,β-unsaturated carboxylic acid, and the proportion of methacrylic acid in the copolymer is 1 to 5 mole %. Ionomer resins using Na$^+$ or Zn$^{++}$ as the metal ion are commercially available, such as Surlyn of Du Pont Co.

As the resin (A), ethylene-vinyl acetate copolymers and ethylene-acrylic acid copolymers are preferred in view of workability.

Saponification products of ethylene-vinyl acetate copolymers are superior in vibration-damping ability, workability and oil resistance. Here, the degree of saponification for these products can optionally be taken, however, 70 to 98% of a saponification degree is desired from the overall standpoint of vibration-damping ability, workability and oil resistance.

As the synthetic rubber having a percentage of elongation at 20° C. of 100% or above and a peak temperature of dissipation factor (tan $\delta$) of $-120°$ to 50° C., there can be used elastomers such as nitrile rubber (NBR), styrene rubber (SBR), acrylic rubber (AR), fluorine rubber (FR), butyl rubber (IIR), natural rubber (NR), synthetic isoprene rubber (IR), butadiene rubber (BR), chloroprene rubber (CR), ethylene propylene rubber (EPR), chlorinated butyl rubber (CIR), 1,2-polybutadiene, thermoplastic polyurethane and the like.

Of these, butyl rubber, namely, isobutyleneisoprene copolymers are preferred in view of workability and vibration-damping ability over a natural temperature range of $-20°$ to 50° C.

The polyolefin type resin (B) having a modulus of elasticity in shear at 20° C. larger than that of the resin (A), a percentage of elongation at 20° C. of 10% or above, a peak temperature of dissipation factor (tan $\delta$) of $-40°$ to 180° C. and a bonding strength toward metal plates at 20° C. and 180°-peeling of 3 kg/cm or above, belongs to the same chemical category with that of polyolefin type resins used in the middle layer of the vibration-damping layer and is a modified crystalline polyolefin produced by modifying a crystalline polyolefin (C) with at least one monomer (D) selected from unsaturated carboxylic acids and their anhydrides. As the crystalline polyolefin (C), there can be mentioned olefin homopolymers (e.g. low, medium and high density polyethylenes, polypropylene, polybutene-1), olefin copolymers (e.g. ethylene-propylene copolymer, ethylene-butene copolymer), their mixtures, mixtures between said polymer and a small amount of a rubber-like substance, etc. Of these, low, medium and high density polyethylenes as well as a polypropylene are preferred. A linear, low density polyethylene is particularly preferred.

As the monomer (D) selected from unsaturated carboxylic acids and their anhydrides, there can be mentioned, for example, acrylic acid, methacrylic acid, maleic acid, fumaric acid, itaconic acid, maleic anhydride and itaconic anhydride. Of these, acrylic acid, methacrylic acid and maleic anhydride are preferred.

The modified crystalline polyolefin can be produced in various processes. As one preferred process can be mentioned a process wherein a crystalline polyolefin is mixed with (1) a monomer selected from unsaturated carboxylic acids and their anhydrides and (2) a radical-releasing agent and the mixture is subjected to reaction in a tightly sealed system at a temperature higher than the melting point of the polyolefin, preferably at 170° C. or above.

The resin (B) can be a mixture of the modified polyolefin with the amorphous polymer (E) and/or the ethylenic polymer (F). This mixture is advantageous because it has a more improved bonding property toward metal plates and absorbs vibrations over a wider temperature range. The content of (E) and/or (F) in the above mixture (resin B) is preferably 0 to 80% by weight.

As the amorphous polymer (E), there can be mentioned (meth)acrylate type polymers, polyisobutylenes, 1,2-polybutadienes, acrylonitrile-styrene copolymers, petroleum resins, etc. Of these, (meth)acrylate type polymers are preferred.

As the ethylenic polymer (F), there can be mentioned at least one polymer selected from ethylene homopolymers, ethylene-α-olefin copolymers and ethylene-unsaturated ester copolymers.

The present invention is put into practice as follows. A resin (A) or a resin composition composed of a resin (A) and a particular synthetic rubber is molded into a film by an ordinary molding process such as, for example, inflation process, calender process, T die process or the like. On both sides of this film as a middle layer, there is provided a layer of resin (B) which is at least one modified crystalline polyolefins as an upper layer and a lower layer by one of conventional techniques. These conventional techniques include a process wherein each film layer are firstly formed and then they are converted into a multilayer film by a dry lamination method, a heat lamination method or the like, a process wherein at least one modified crystalline polyolefins resin (B) is extruded onto a film of at least one resin selected from the group consisting of polyolefin type resin A ionomer resins to form a multilayer film and a process wherein a plurality of resins are simultaneously extruded into respective films and laminated into a multilayer film. The last process is particularly preferred in view of moldability, interlayer bonding strength of multilayer film obtained and cost.

With respect to the thickness of the middle layer resin and the upper and lower layers resin each different in modulus of elasticity, percentage of elongation and peak temperature of loss factor ($\eta$), the middle layer resin preferably has a thickness of 20 to 95% based on the total film thickness (thickness of the vibration-damping layer) in view of superior workability and large vibration-absorbing ability over a wide temperature range. More preferably, the middle layer resin has a thickness of 80 to 90%. When the total film thickness is 30 to 1,000$\mu$, there is obtained good vibration-damping property. In order to expect good workability in bending, deep drawing, etc., a total film thickness of 30 to 100$\mu$ is preferred. The total film thickness is more preferably 30 to 60$\mu$.

The synthetic rubber used in the middle layer resin mixture can be employed in a broad range of 10 to 80% based on the mixture. However, 25 to 60% is preferred in view of improvement of vibration-damping ability and easiness of bending.

In producing a vibration-damping material according to the present invention, an ordinary method such as batch or continuous thermal pressing can optionally be used. For example, there is a method wherein a multilayer film prepared from the above mentioned resins is interposed between two metal plates and they are pressure-bonded with heating. The heating temperature generally is 150° to 220° C.

The present invention will specifically be explained below by way of Examples. However, these Examples are only illustrative and the present invention is in no way restricted by them.

In the Examples, the content of maleic anhydride was determined by dissolving a resin in xylene and neutralizing with an alcoholic sodium hydroxide solution using phenolphthalein as an indicator. The moduli of elasticity and disspation factor (tan $\delta$) of the upper and lower layer film and the middle layer film were measured by the use of a Rheovibron (110 Hz) manufactured by Toyo Baldwin Co., Ltd. The percentages of elongation of these films were measured at a pulling speed of 200 mm/min.

Loss factor ($\eta$) representing the vibration-absorbing ability of a vibration-damping material was measured by applying a forced vibration by a mechanical impedance method (vibration applied at the center) wherein the frequency was 1,000 Hz and the temperature was 20° to 130° C. Bonding strength toward steel plates was evaluated by interposing the above mentioned multilayer film of 50 to 100$\mu$ thickness between two same cold-rolled steel plates of 0.8 mm thickness, pressure-bonding them under conditions of 30 kg/cm$^2$, 190° C. and 5 min, and subjecting the resulting laminate to peeling at 180° and a pulling speed of 50 mm/min.

Saponification degree was determined by an alkali saponification method.

Figure 1B:
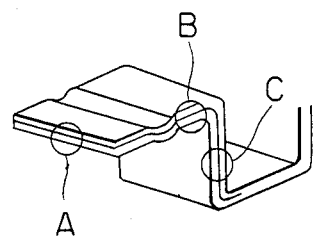
Figure 2A:
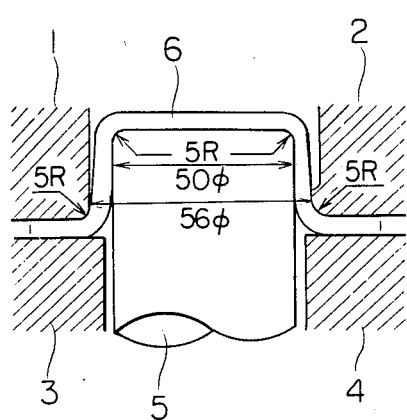
FIG. 2 (a) is a sectional view of a die used in deep drawing test.
Figure 2B:
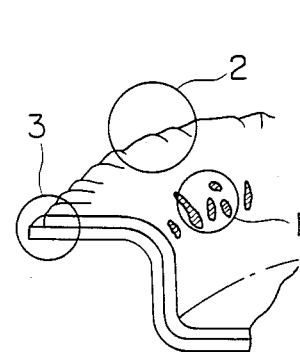

With respect to workability, bending test and deep drawing test were carried out by the use of dies shown in FIG. 1 and FIG. 2, respectively, and there were evaluated slippage, peeling, wrinkle, etc.

FIG. 1 (a) is a sectional view of the die used in bending test. In FIG. 1 (a), 1, 2 and 3 are die members; 4 is a specer; 5 is a sample; and 2R and 5R are curvatures. FIG. 1 (b) is a perspective view of a shaped article obtained in bending test. In FIG. 1 (b), portions A, B and C are portions for which observation and evaluation are to be made.

FIG. 2 (a) is a sectional view of the die used in deep drawing test. In FIG. 2 (a), 1, 2, 3, 4 and 5 are portion members of the die; 6 is a sample; 5R is a curvature; and 50$\phi$ and 56$\phi$ are curvature radii at portions whose curvatures are 5R. FIG. 2 (b) is a perspective view of a shaped article obtained in deep drawing test. In FIG. 2 (b), 1, 2 and 3 are portions for observation and evaluation of wrinkles at portion A, flange wrinkles and plate slippage, respectively.

EXAMPLES 1 to 3

To a linear low density polyethylene of a melt index of 4 g/10 min (manufactured by CdF Chimie), were added 0.7% by weight (based on the polyethylene) of maleic anhydride and 0.1% by weight (based on the polyethylene) of t-butyl peroxylaurate. They were mixed for 2 min by a Henschell mixer. The mixture was kneaded by an extruder of 30 mm $\phi$ maintained at 190° C. and then pelletized.

Figure 3:
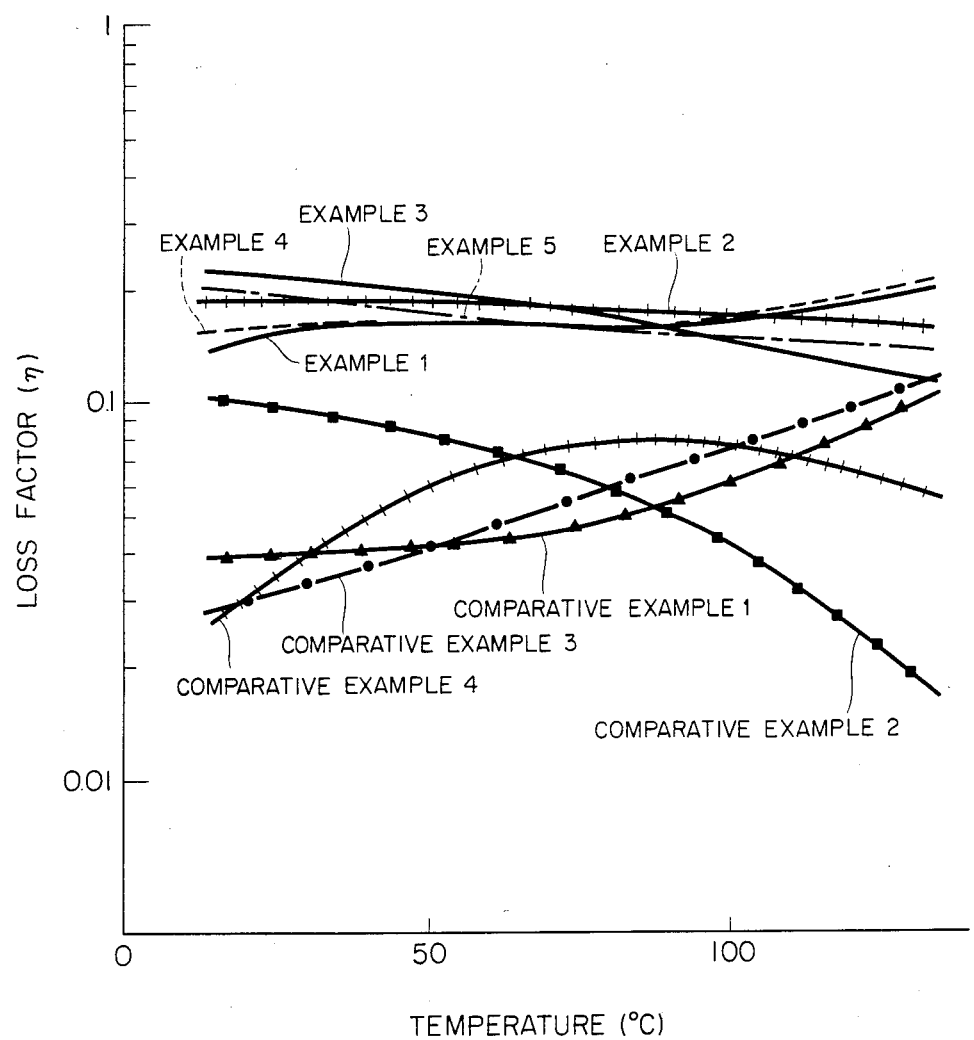
FIGS. 3 to 5 are graphs showing relations between temperature and loss factor ($\eta$), of various vibration-damping materials.

These pellets (referred to as an upper and lower layer resin) were supplied to the upper and lower layers of a multilayer inflation apparatus equipped with two kind-three layer inflation die of 150 mm bore, through an extruder of 40 mm bore under conditions of melting zone temperature of 180° C. and a die temperature of 180° C. To the middle layer die of the above apparatus, was supplied an ethylene-vinyl acetate copolymer (Evatate ® manufactured by Sumitomo Chemical Co., Ltd.) having a melt index of 3 g/10 min under conditions of a melting zone temperature of 170° C. and a die temperature of 180° C.. The resins supplied to each layer die were placed together inside the die to obtain a tubular material having a three layer sandwich structure. The tubular material was taken off under conditions of a take-off speed of 3.5 m/min and a blow-up ratio of 2.0, whereby there was obtained a film of three layer sandwich structure having flat width of 470 mm and each layer thickness as shown in Table 1. The resulting film was interposed between two same cold-rolled steel plates of 0.8 mm thickness, and they were pressure-bonded with heating (30 kg/cm$^2$, 190° C., 5 min). The resulting laminate was measured for bonding property, workability and vibration-absorbing property. The results are shown in Tables 2 to 4 and FIG. 3.

EXAMPLES 4 and 5

The upper and lower layer resin (pellets) prepared in Examples 1 to 3 was mixed with a linear, low density polyethylene having a melt index of 4 g/10 min (manufactured by CdF Chimie) and a methyl methacrylate polymer, in a proportion as shown in Table 5. The mixture was extruded by an extruder at 190° C. for repelletization. The resulting mixture pellets were used as an upper and lower layer resin for these Examples.

As a middle layer resin, there was used an ethylene-acrylic acid copolymer having a melt index of 2 g/10 min (manufactured by Dow Chemical Co.). In the same manner as in Examples 1 to 3, there were obtained films each having upper, middle and lower layer thicknesses as shown in Table 1.

The films were each interposed between two same cold-rolled steel plates of 0.8 mm thickness, and they were pressure-bonded with heating (30 kg/cm$^2$, 190° C., 5 min). The resulting laminates were measured for bonding property, workability and vibration-absorbing property. The results are shown in Tables 2 to 4 and FIG. 3.

EXAMPLES 6 to 8

To a linear low density polyethylene of a melt index of 4 g/10 min (manufactured by CdF Chimie), were added 0.7% by weight (based on the polyethylene) of maleic anhydride and 0.1% by weight (based on the polyethylene) of t-butyl peroxylaurate. They were mixed for 2 min by a Henschell mixer. The mixture was kneaded by an extruder of 30 mm φ maintained at 190° C. and then pelletized.

Figure 4:
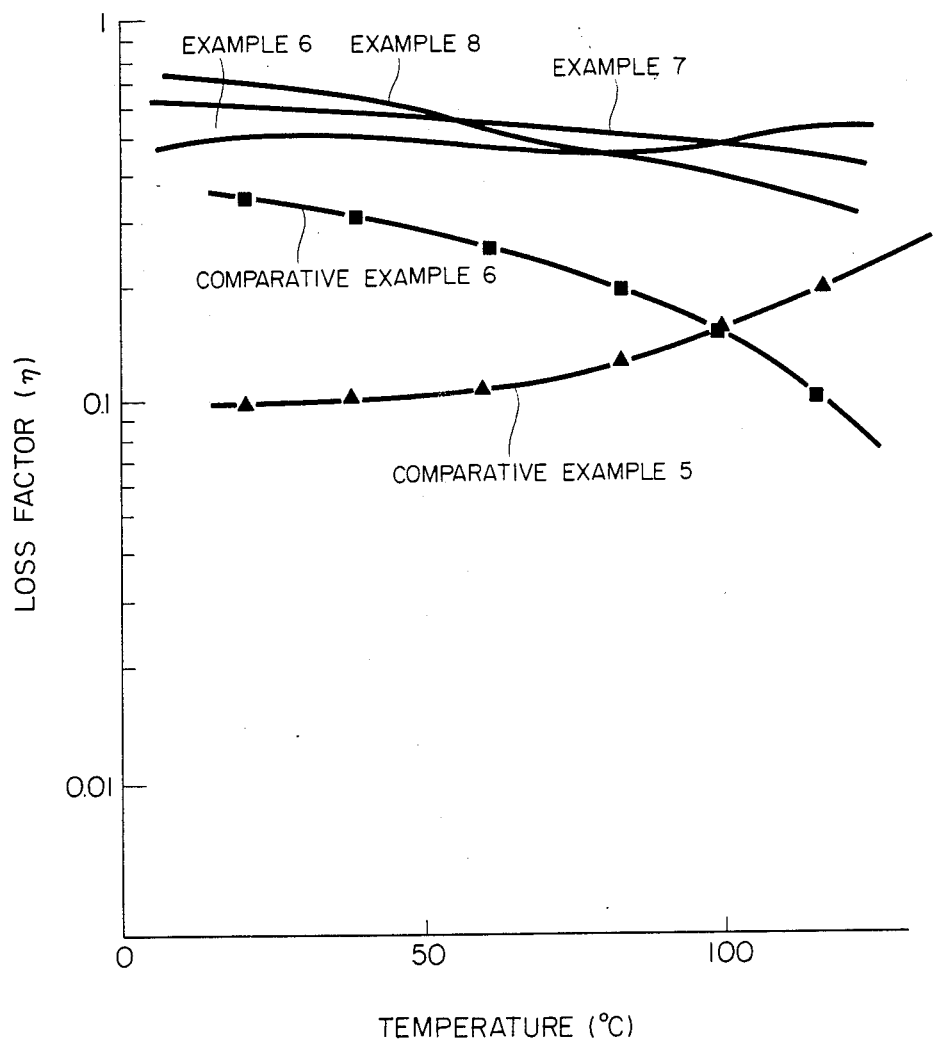

These pellets (referred to as an upper and lower layer resin) were supplied to the upper and lower layers of a multilayer inflation apparatus equipped with a two kind-three layer inflation die of 150 mm bore, through an extruder of 40 mm bore under conditions of melting zone temperature of 180° C. and a die temperature of 180° C. To the middle layer die of the above apparatus, was supplied a composition composed of 70% by weight of an ethylenevinyl acetate copolymer by (Evatate ® manufactured by Sumitomo Chemical Co., Ltd.) having a melt index of 3 g/10 min and 30% by weight of a butyl rubber (JSR Butyl No. 268 manufactured by Japan Synthetic Rubber Co., Ltd.), under conditions of a melting zone temperature of 170° C. and a die temperature of 180° C. The resins supplied to each layer die were placed together inside the die to obtain a tubular material having a three layer sandwich structure. The tubular material was taken off under conditions of a take-off speed of 7.0 m/min and a blow-up ratio of 2.0, whereby there were obtained films of three layer sandwich structure having a flat width of 470 mm and each layer thickness as shown in Table 1. The resulting film was interposed between two same cold-rolled steel plates of 0.8 mm thickness, and they were pressure-bonded with heating (30 kg/cm², 190° C., 5 min). The resulting laminate was measured for bonding property, workability and vibration-absorbing property. The results are shown in Tables 2 to 4 and FIG. 4.

EXAMPLES 9 to 11

To a linear low density polyethylene of a melt index of 4 g/10 min (manufactured by CdF Chimie), were added 0.7% by weight (based on the polyethylene) of maleic anhydride and 0.1% by weight (based on the polyethylene) of t-butyl peroxylaurate. They were mixed for 2 min by a Henschell mixer. The mixture was kneaded by an extruder of 30 mm φ maintained at 190° C. and then pelletized.

Figure 5:
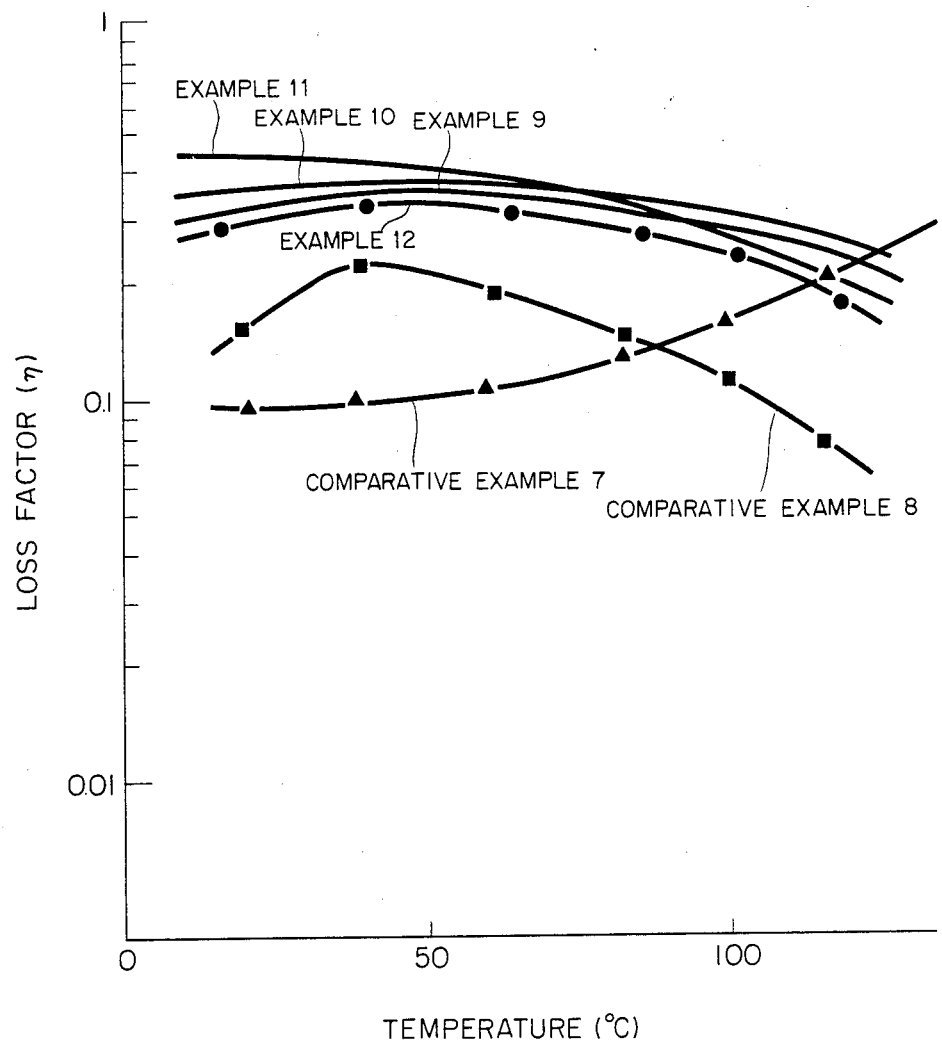

These pellets (referred to as an upper and lower layer resin) were supplied to the upper and lower layers of a multilayer inflation apparatus equipped with a two kind-three layer inflation die of 150 mm bore, through an extruder of 40 mm bore under conditions of melting zone temperature of 180° C. and a die temperature of 180° C. To the middle layer die of the above apparatus was supplied a 75% saponification product of an ethylene-vinyl acetate copolymer (Evatate ® manufactured by Sumitomo Chemical Co., Ltd.) having a melt index of 3 g/10 min under conditions of a melting zone temperature of 170° C. and a die temperature of 180° C. The resins supplied to each die layer were placed together inside the die to obtain a tubular material having a three layer sandwich structure. The tubular material was taken off under conditions of a take-off speed of 7.0 m/min and a blow-up ratio of 2.0, whereby there was obtained a film of three layer sandwich structure having a flat width of 470 mm and each layer thickness as shown in Table 1. The resulting film was interposed between two same cold-rolled steel plates of 0.8 mm thickness, and they were pressure-bonded with heating (30 kg/cm², 190° C., 5 min). The resulting laminate was measured for bonding property, workability and vibration-absorbing property. The results are shown in Tables 2 to 4 and FIG. 5.

COMPARATIVE EXAMPLES 1 to 4

Each of the upper and lower layer resins and the middle layer resins of Examples 1 to 3 and Examples 4 to 5 was supplied to the die of an inflation apparatus equipped with an inflation die having a bore of 100 mm, through an extruder having a bore of 30 mm under conditions of a melting zone temperature of 170° C. and a die temperature of 170° C., whereby there was obtained a tubular material. The tubular material was taken off under conditions of a take-off speed of 3 m/min and a blow-up ratio of 2.0. Thus, there were obtained four kinds of films each having a flat width of 300 mm and a thickness as shown in Table 6. Each film was interposed between two same cold-rolled steel plates of 0.8 mm thickness, and they were pressure-bonded with heating (30 kg/cm², 5 min). The resulting laminates were measured for bonding property, workability and vibration-absorbing property. The results are shown in Tables 2 to 4 and FIG. 3.

COMPARATIVE EXAMPLES 5 and 6

Each of the upper and lower layer resins and the middle layer resin of Examples 6 to 8 was supplied to the die of an inflation apparatus equipped with an inflation die having a bore of 100 mm, through an extruder having a bore of 30 mm under conditions of a melting zone temperature of 170° C. and a die temperature of 170° C., whereby there was obtained a tubular material. The tubular material was taken off under conditions of a take-off speed of 7.0 m/min and a blow-up ratio of 2.0. Thus, there were obtained two kinds of films each having a flat width of 300 mm and a thickness as shown in Table 6. Each film was interposed between two same cold-rolled steel plates of 0.8 mm thickness, and they were pressure-bonded with heating (30 kg/cm², 180° C., 5 min). The resulting laminates were measured for bonding property, workability and vibration-absorbing ability. The results are shown in Tables 2 to 4 and FIG. 4.

COMPARATIVE EXAMPLES 7 AND 8 AND EXAMPLE 12

Each of the upper and lower layer resins and the middle layer resin of Examples 9 to 11 was supplied to the die of an inflation apparatus equipped with an inflation die having a bore of 100 mm, through an extruder having a bore of 30 mm under conditions of a melting zone temperature of 170° C. and a die temperature of 170° C., whereby there was obtained a tubular material. The tubular material was taken off under conditions of a take-off speed of 7.0 m/min and a blow-up ratio of 2.0. Thus, there were obtained three kinds of films each having a flat width of 300 mm and a thickness as shown in Table 6. Each film was interposed between two same cold-rolled steel plates of 0.8 mm thickness, and they were pressure-bonded with heating (30 kg/cm², 180° C., 5 min). The resulting laminates were measured for bonding property, workability and vibration-absorbing ability. The results are shown in Tables 2 to 4 and FIG. 5.

The laminate of Example 12 is for oil resistance comparison with the laminate of Example 11 and is different from the latter laminate only in that the former laminate uses, for the middle layer resin, an ethylene-vinyl acetate copolymer having a melt index of 3 g/10 min (Evatate ® manufactured by Sumitomo Chemical Co., Ltd.). Comparative oil resistance data between these two laminates are shown in Table 7.

TABLE 1

Thickness of each Layer of Film

| Example | Upper layer (μ) | Middle layer (μ) | Lower layer (μ) |
|---|---|---|---|
| 1 | 30 | 40 | 30 |
| 2 | 20 | 60 | 20 |
| 3 | 10 | 80 | 10 |
| 4 | 30 | 40 | 30 |
| 5 | 10 | 80 | 10 |
| 6 | 15 | 20 | 15 |
| 7 | 10 | 30 | 10 |
| 8 | 5 | 40 | 5 |
| 9 | 15 | 20 | 15 |
| 10 | 10 | 30 | 10 |
| 11 | 5 | 40 | 5 |

TABLE 2

Physical properties of each resin layer

| | Middle layer resin | | | Upper and lower layer resin | | |
|---|---|---|---|---|---|---|
| | Modulus of elasticity in shear at 20° C. (dyne/cm$^2$) | Elongation (%) | tan δ peak temperature (°C.) | Modulus of elasticity in shear at 20° C. (dyne/cm$^2$) | Elongation (%) | tan δ peak temperature (°C.) |
| Examples 1 to 3 | 7.5 × 10$^8$ | 500 | 15 | 1.4 × 10$^9$ | 50 | 115 |
| Examples 4 to 5 | 1.0 × 10$^9$ | 400 | 60 | 2.3 × 10$^9$ | 20 | 125 |
| Examples 6 to 8 | 7.5 × 10$^8$ | 400 | −10 | 1.4 × 10$^9$ | 50 | 115 |
| Examples 9 to 11 | — | 150 | 18 | 1.4 × 10$^9$ | 50 | 115 |
| Comparative Example 1 | — | — | — | 1.4 × 10$^9$ | 50 | 115 |
| Comparative Example 2 | 7.5 × 10$^8$ | 500 | 15 | — | — | — |
| Comparative Example 3 | — | — | — | 2.3 × 10$^9$ | 20 | 125 |
| Comparative Example 4 | 1.0 × 10$^9$ | 400 | 60 | — | — | — |
| Comparative Example 5 | — | — | — | 1.4 × 10$^9$ | 50 | 115 |
| Comparative Example 6 | 7.5 × 10$^8$ | 400 | −10 | — | — | — |
| Comparative Example 7 | — | 150 | 18 | — | — | — |
| Comparative Example 8 | — | — | — | 1.4 × 10$^9$ | 50 | 115 |
| Example 12 | — | 500 | 15 | — | — | — |

TABLE 3

Bonding property and vibration-absorbing property

| | Steel plate/ polymer/steel plate peeling strength (kg/cm) | Loss factor (η) | | |
|---|---|---|---|---|
| | | 20° C. | 80° C. | 130° C. |
| Example 1 | 7.2 | 0.15 | 0.16 | 0.20 |
| Example 2 | 7.0 | 0.19 | 0.18 | 0.16 |
| Example 3 | 7.3 | 0.22 | 0.17 | 0.12 |
| Example 4 | 7.8 | 0.16 | 0.16 | 0.21 |
| Example 5 | 7.6 | 0.20 | 0.16 | 0.14 |
| Example 6 | 7.2 | 0.48 | 0.49 | 0.58 |
| Example 7 | 7.0 | 0.62 | 0.58 | 0.49 |
| Example 8 | 7.3 | 0.71 | 0.43 | 0.32 |
| Example 9 | 7.2 | 0.30 | 0.28 | 0.26 |
| Example 10 | 7.0 | 0.34 | 0.32 | 0.27 |
| Example 11 | 7.3 | 0.42 | 0.30 | 0.20 |
| Comparative Example 1 | 7.1 | 0.04 | 0.05 | 0.10 |
| Comparative Example 2 | 0.2 | 0.10 | 0.06 | 0.02 |
| Comparative Example 3 | 7.5 | 0.03 | 0.06 | 0.11 |
| Comparative Example 4 | 0.8 | 0.03 | 0.08 | 0.06 |
| Comparative Example 5 | 7.1 | 0.10 | 0.12 | 0.19 |
| Comparative Example 6 | 0.2 | 0.36 | 0.20 | 0.09 |
| Comparative Example 7 | 7.1 | 0.09 | 0.13 | 0.20 |
| Comparative Example 8 | 0.2 | 0.15 | 0.14 | 0.07 |
| Example 12 | 7.5 | 0.28 | 0.28 | 0.18 |

TABLE 4

Workability

| | Bending test | | | | Deep drawing | | |
|---|---|---|---|---|---|---|---|
| | Portion A slippage | Portion A peeling | Portion B peeling | Portion C peeling | Plate slippage 2 Ton* | Portion A wrinkle 2 Ton* | Flange wrinkle 2 Ton* |
| Example 1 | o | o | o | o | o | o | o |
| Example 2 | o | o | o | o | o | o | o |

TABLE 4-continued

|  | Workability | | | | Deep drawing | | |
|---|---|---|---|---|---|---|---|
|  | Bending test | | | | Plate slippage 2 Ton* | Portion A wrinkle 2 Ton* | Flange wrinkle 2 Ton* |
|  | Portion A slippage | Portion A peeling | Portion B peeling | Portion C peeling | | | |
| Example 3 | o | o | o | o | o | o | o |
| Example 4 | o | o | o | o | o | o | o |
| Example 5 | o | o | o | o | o | o | o |
| Example 6 | o | o | o | o | o | o | o |
| Example 7 | o | o | o | o | o | o | o |
| Example 8 | o | o | o | o | o | o | o |
| Example 9 | o | o | o | o | o | o | o |
| Example 10 | o | o | o | o | o | o | o |
| Example 11 | o | o | o | o | o | o | o |
| Comparative Example 1 | o | o | x | x | o | o | x |
| Comparative Example 2 | x | x | x | x | x | x | x |
| Comparative Example 3 | o | o | x | x | o | o | x |
| Comparative Example 4 | x | x | x | o | x | x | x |
| Comparative Example 5 | o | o | x | x | o | o | x |
| Comparative Example 6 | x | x | x | x | x | x | x |
| Comparative Example 7 | o | o | x | x | o | o | x |
| Comparative Example 8 | x | x | x | x | x | x | x |
| Comparative Example 12 | o | o | o | o | o | o | o |

Evaluation
Slippage o: No
x: Yes
Peeling o: No
x: Yes
Wrinkle o: No
x: Yes
*Blank holder pressure

TABLE 5

| Recipe | | |
|---|---|---|
| Modified linear lower density polyethylene (wt %) | Linear low density polyethylene (wt %) | Methyl methacrylate polymer (wt %) |
| 40 | 40 | 20 |

TABLE 7

| Comparative oil resistance data | | | | | |
|---|---|---|---|---|---|
| | | Test item Bonding strength* after oil immersion** (kg/cm) | | | |
| | | Immersion time | | | |
| Sample | | 0 hr | 120 hr | 250 hr | 500 hr |
| Example 11 | Max. | 7.6 | 7.5 | 7.3 | 7.4 |
|  | Min. | 7.3 | 7.1 | 7.0 | 7.1 |

TABLE 6

| | Thickness (unit: μ) | | | | | | | | |
|---|---|---|---|---|---|---|---|---|---|
| | Upper and lower layer resin of Examples 1 to 3 | Middle layer resin of Examples 1 to 3 | Upper and lower layer resin of Examples 4 to 5 | Middle layer resin of Examples 4 to 5 | Upper and lower layer resin of Examples 6 to 8 | Middle layer resin of Examples 6 to 8 | Upper and lower layer resin of Examples 9 to 11 | Middle layer resin of Examples 9 to 11 | Constitution of Example 11 (upper and lower layer + middle layer) |
| Comparative Example 1 | 100 | | | | | | | | |
| Comparative Example 2 | | 100 | | | | | | | |
| Comparative Example 3 | | | 100 | | | | | | |
| Comparative Example 4 | | | | 100 | | | | | |
| Comparative Example 5 | | | | | 50 | | | | |
| Comparative Example 6 | | | | | | 50 | | | |
| Comparative Example 7 | | | | | | | 50 | | |
| Comparative Example 8 | | | | | | | | 50 | |
| Comparative Example 12 | | | | | | | | | 50 (5/40/5) |

TABLE 7-continued

Comparative oil resistance data

| | | Test item Bonding strength* after oil immersion** (kg/cm) Immersion time | | | |
|---|---|---|---|---|---|
| Sample | | 0 hr | 120 hr | 250 hr | 500 hr |
| Example 12 | Max. | 9.5 | 8.0 | 7.2 | 6.2 |
| | Min. | 9.2 | 6.5 | 6.3 | 4.7 |

*Peeling strength by T-peel
**Immersion at 80° C. in Toyota's Castle Motor Oil 10W/40

What is claimed is:

1. A vibration-damping material with excellent workability consisting of two metal plates and a vibration-damping layer of a thermoplastic resin interposed between the two metal plates, in which the vibration-damping layer of a thermoplastic resin has a total thickness of 30 to 100μ and consists of a film as a middle layer and a polyolefin type resin (B) provided on both sides of the film as an upper and lower layer, the middle layer being composed of (1) at least one resin (A) selected from the group consisting of an ethylene-vinyl acetate copolymer, an ethylene-acrylic acid copolymer and a saponification product of an ethylene-vinyl acetate copolymer each having a modulus of elasticity in shear at 20° C. of $3 \times 10^9$ to $1 \times 10^7$ dyne/cm², a percentage of elongation at 20° C. of 50% or above and a peak temperature of dissipation factor (tan δ) of $-120°$ to 80° C. or (2) a resin mixture of the resin (A) and a synthetic rubber having a percentage of elongation at 20° C. of 100% or above and a peak temperature of dissipation factor (tan δ) of $-120°$ to 50° C., and the polyolefin type resin (B) being selected from the group consisting of a mixture of a modification product of a linear low density polyethylene with maleic anhydride and (meth)acrylic acid ester polymer, or a mixture of said mixture and a linear low density polyethylene, said mixtures having a modulus of elasticity in shear at 20° C. larger than that of the resin (A), a percentage of elongation at 20° C. of 10% or above, a peak temperature of dissipation factor (tan δ) of $-40°$ to 180° C. and a bonding strength toward the metal plates at 20° C. and 180°-peeling of 3 kg/cm or above.

2. A vibration-damping material according to claim 1, wherein the synthetic rubber is an isobutylene-isoprene copolymer.

3. A vibration-damping material according to claim 1, wherein the middle layer has a thickness of 20 to 95% based on the total film thickness.

4. A vibration-damping material according to claim 1, wherein the middle layer has a thickness of 80 to 90% based on the total film thickness.

5. A vibration-damping material according to claim 1, wherein the total film thickness is 30 to 60μ.

6. A vibration-damping material according to claim I, wherein the ratio of the synthetic rubber in the resin mixture with the resin A is 10 to 80% based on the mixture.

7. A vibration-damping material according to claim 6, wherein the ratio of the synthetic rubber in the resin mixture with the resin A is 25 to 60% based on the mixture.

* * * * *